United States Patent [19]
Goff et al.

[11] Patent Number: 5,999,171
[45] Date of Patent: Dec. 7, 1999

[54] DETECTION OF OBJECTS ON A COMPUTER DISPLAY

[75] Inventors: Lonnie C. Goff; Mark Eidson, both of Tempe; Peter Chambers, Phoenix; David R. Evoy, Tempe, all of Ariz.

[73] Assignee: VLSI Technology, Inc., San Jose, Calif.

[21] Appl. No.: 08/878,866

[22] Filed: Jun. 19, 1997

[51] Int. Cl.⁶ .................................................. G09G 1/00
[52] U.S. Cl. .................. 345/180; 345/157; 345/158; 345/179
[58] Field of Search ..................................... 345/180, 157, 345/158, 179, 422, 473; 463/30

[56] References Cited

U.S. PATENT DOCUMENTS

| | | | |
|---|---|---|---|
| 4,748,318 | 5/1988 | Bearden et al. | 235/462 |
| 5,187,361 | 2/1993 | Ishii | 250/222.1 |
| 5,481,275 | 1/1996 | Mical et al. | 345/132 |
| 5,729,252 | 3/1998 | Fraser | 345/302 |
| 5,816,817 | 10/1998 | Tsang et al. | 434/22 |
| 5,835,078 | 11/1998 | Arita et al. | 345/78 |

*Primary Examiner*—Dennis-Doon Chow
*Assistant Examiner*—Fritz Alphonse
*Attorney, Agent, or Firm*—Burns, Doane, Swecker & Mathis LLP

[57] ABSTRACT

A method and system of detecting objects displayed on a display screen is described. Each object displayed on the screen visually emits a unique identification signal. The identification signal or lack of an identification signal is detected by a detector such as a light pen or video gun and the detector transmits the identification signal on a serial bus to the display screen graphics controller thereby indicating to the controller the position on the screen at which the detector is pointed.

23 Claims, 2 Drawing Sheets

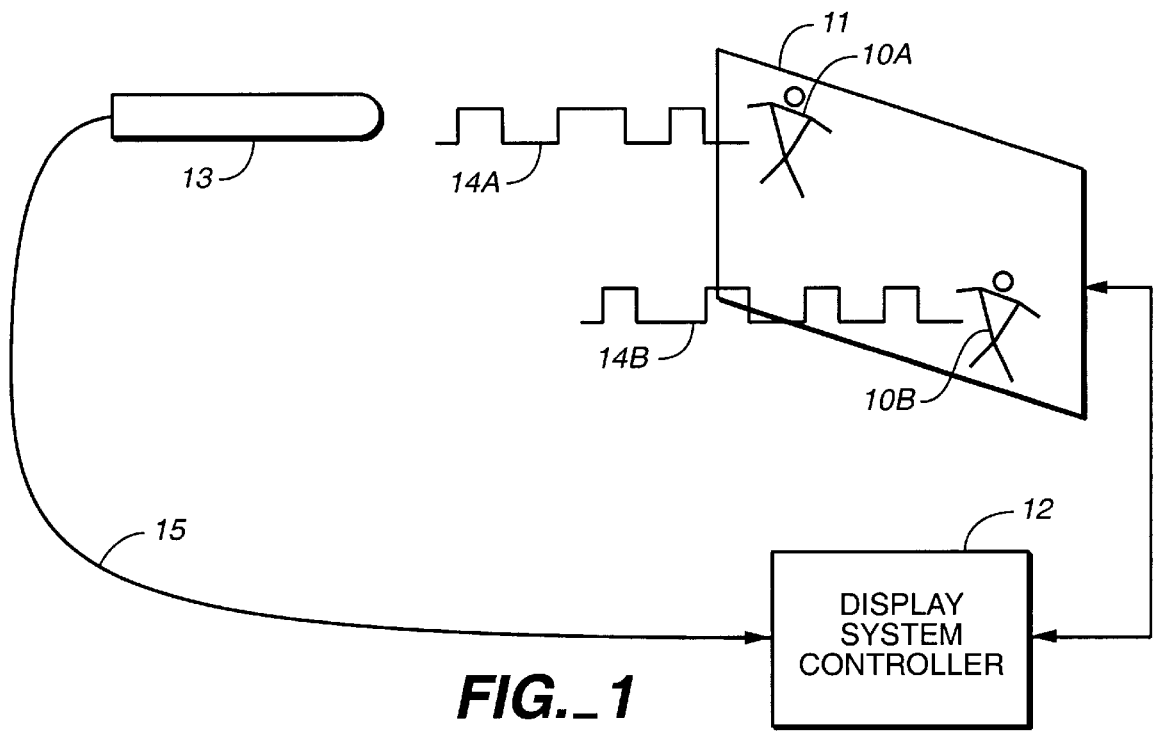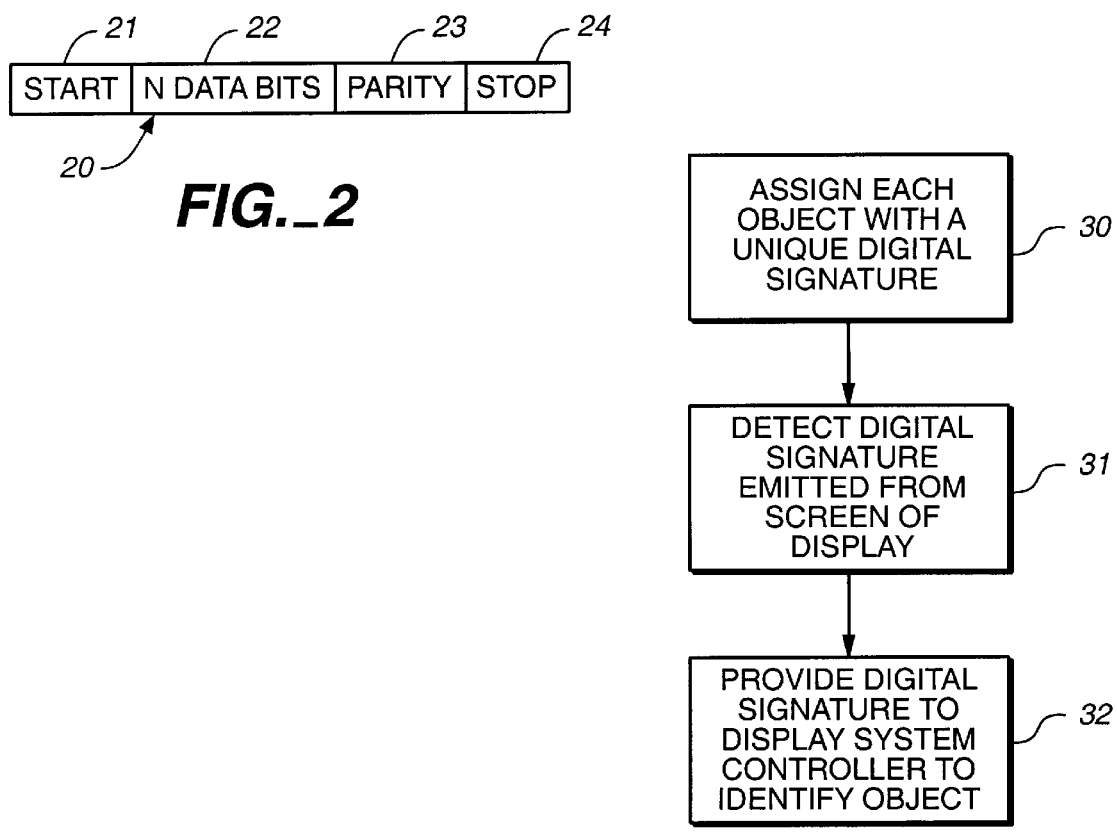

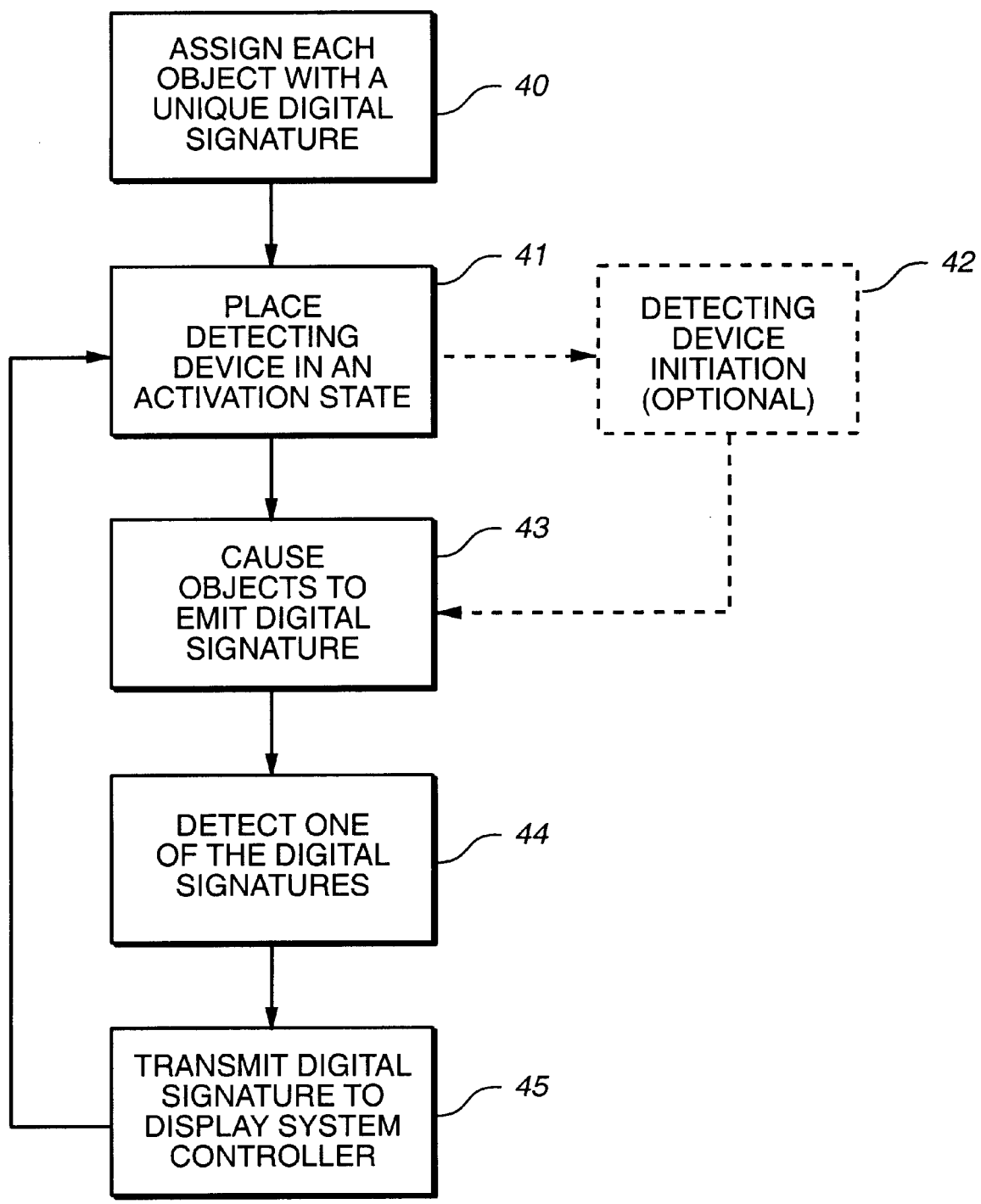
FIG._4

DETECTION OF OBJECTS ON A COMPUTER DISPLAY

BACKGROUND OF INVENTION

1. Field of the Invention

The present invention relates to a system for the detection of objects on a display screen and, more particularly, to a system for detecting objects on a display screen using an external detection pointing device.

2. State of the Art

Typically, graphical display systems include a display screen having an associated cathode-ray tube (CRT) in which an electron beam is scanned across a photosensitive layer of material, such as phosphorous, to cause an image to be displayed on the screen. The image can include a collection of objects or can be textual. The electron beam, and hence, the image is typically controlled by a CRT and graphics controller. Often, such systems include a human interface device which allows a system user to interact with the information being displayed on the screen. In particular, one specific type of user interface is one in which the user aims at the screen and the location at which the interface is aimed is determined by the graphics or CRT controller.

One example of a graphical display system having the above-described type of user interface is a video game system. Typically, a video game displays moving objects on a screen. The user interface is often embodied as a pointing or aiming device such as an arcade gun having a trigger. In use, a user aims the detector at objects on the screen and depresses the trigger. If the detector is aligned with the position of one of the objects on the screen a "hit" is achieved, if not a "miss" occurs. Hence in this type of system, the graphical display system operates as if it recognizes whether the detector is pointing at a given object on the display screen.

One manner in which such apparent "point on shoot" operation is achieved is by using a CRT row/column counter that tracks the location of the electron beam on the screen the CRT beam is scanning. While aiming the device at the screen, the user transmits a pulse to the display system CRT or graphics controller (e.g., by pulling the trigger of an arcade gun) which causes the most current row/column values of the counter to be latched. These values represent where the detector was pointed when the trigger was depressed. In this system, the connection between the detector and the row/column circuitry is a relatively fast communication path (typically, directly wired) and hence, by the time the pulse is transmitted from the detector to the row/column circuitry, the difference between the actual location of the detector and the latched row/column location is relatively small. Hence, the accuracy of this detection technique relies on a fast communication path between the detector device and the row/column circuitry.

Recently graphical display systems are being designed such that the connection between the user interface (i.e. the aiming detector device) and the display system is a software controlled interface. Specifically, the connection can be embodied as a polled interface in which the user interface cannot initiate a communication with the host system (i.e. the graphics or system controller) on its own. Instead, it is first polled by the host system. Hence, with respect to the above object detection system, the host system would need to poll the detector device prior to the detector device providing the pulse to the row/column circuitry to latch its location. However, since this communication process can take a relatively long time, object detection accuracy is greatly diminished using the above technique which relies on a "fast" path between the detecting device and the CRT control circuitry.

What is needed is a system and method for detecting objects on a display screen which is not constrained by the speed of the communication path between the aiming detector device and the display system controller.

SUMMARY OF THE INVENTION

The present invention, briefly stated, is a system and method for detecting objects on a display screen by providing each object displayed by the screen with a particular identification signal. The objects emit an identification signal from the screen of the system which is detectable by an external pointing detector device. The external detector device then transmits back to the display screen controller that it has detected a particular object's identification signal thereby indicating which object the detecting device is pointing at on the screen. The display screen controller can then determine the location of the point at which the detector device is directed towards since it knows the location of each object on the screen using a system software application. Alternatively, the detector transmits to the display screen controller the lack of an identification signal indicating that the pointing device is not directed towards any object on the screen.

In one embodiment, the objects represent targets in a video game and the pointing device is implemented as a video arcade gun used to "shoot" at the objects. The location information passed to the display controller can then be used to determine a "hit" or a "miss" of the target. Depressing the trigger of the gun puts it into an active-state and causes it to be reset. When this occurs, the objects on the screen begin to emit their corresponding identification signal. The arcade gun detects the identification signal corresponding to the object on the screen that it is directed towards and transmits this signal to a display system controller. Communication between the detection device and the display system controller, in one embodiment, is performed over a polled serial bus such as a universal serial interface.

The detector includes an optical sensor for detecting the identification signal. The identification signal is embodied as an sequence of encoded light pulses. The light pulses represent an encode binary signal wherein each of the objects emit a unique identification number in the code. Various digital encoding techniques can be used such as binary, ASCII, and a bar code.

BRIEF DESCRIPTION OF THE DRAWINGS

FIG. 1 shows a block diagram of one embodiment of a system for performing object detection in accordance with the present invention.

FIG. 2 shows one embodiment of a digital signature data pattern.

FIG. 3 shows a flow chart of the steps of one embodiment of a method for detecting objects on a display screen.

FIG. 4 shows a flow chart of the steps of another embodiment of a method for detecting objects on a display screen.

DESCRIPTION OF PREFERRED EMBODIMENTS

FIG. 1 shows a block diagram of a graphical display system illustrating the general concept of the object detection system and method of the present invention. The graphical display system includes a display screen 11, a display system controller 12, and a user interface unit 13.

The display system controller unit 12 includes various control elements such as the system CPU, graphics control elements, CRT control elements, communication interface control, and in general, elements that provide control to cause the display system to produce an image on screen 11. The system CPU can include an application that drives the graphics and CRT control elements to cause a video game to be displayed on the screen. Typically, the application is able to track the location of the objects displayed on the screen. The control elements of the display system controller 12 can be implemented in both software and hardware.

In one embodiment, display screen 11 is a conventional cathode ray tube in which an electron beam, controlled by a CRT controller (not shown), is scanned across a phosphorus screen causing objects 10A and 10B to be displayed.

The light detecting device 13 includes a photosensitive element that detects light (or the absence of light) emitted from the screen. In one embodiment, the detecting device 13 is an arcade gun, a light pen, or a game console pointing device. In accordance with the embodiment shown in FIG. 1, display system controller 12 causes each of the objects 10A and 10B to emit a unique sequence of pulses of light (referred to as a digital signature). FIG. 1 shows object 10A emitting a digital signature 14A and object 10B emitting a digital signature 14B. When detecting device 13 is aimed at a given object on screen 11 it detects the object's unique digital signature. Once it recognizes a valid signature, it transmits it over bus 15 to display system controller 12. The display system controller 12 is then able to determine which object that the detecting device 13 is pointed at since it knows each object's corresponding digital signature.

The digital signature of each object is a unique sequence of light pulses representing an encoded digital pattern emitted by each object. A digital "1" is represented by a first color pixel and a digital "0" by a second color pixel. In essence, when an object emits its digital signature it blinks back and forth between the first and second colors in a manner such that the detecting device 13 is able to discern transitions between the first and second colors with sufficient accuracy. All or only a select group of objects on the screen emit their corresponding digital signature. The signature is repeated for a short burst of time until the detecting device is able to recognize a valid signature sequence or to recognize the abscence of a signature.

The signature for each object is generated by modulating the entire pixel pattern of the object at the rate of the CRT's vertical refresh rate such that for each full frame scan a single bit of the digital signature is emitted. For instance, a digital signature made up of 8-bits of data would take eight full scans to emit. Emitting the digital signature twice would take sixteen full frames.

FIG. 2 shows one embodiment of a digital signature pattern 20 which includes a bit start sequence 21, N data bits 22 representing the digital signature, one parity bit 23, and a bit stop sequence 24. Other embodiments not including parity or start and stop bits are also feasible. When the digital signature is encoded using a binary encoding, the number of characters in the N data bits is dependent on the number of objects to be detected. For instance, if N is equal to 4, then no more than 16 objects (i.e., $2^4$) are detected to ensure a unique digital signature for each object. The digital signature can be digitally encoded using other encoding schemes such as a bar code encoding or an ASCII coding.

One embodiment of the system and method of the present invention is implemented such that a universal serial bus (USB) interface couples the detecting device 13 to display system controller 12. A USB interface is a polled type of interface in which devices cannot communicate on the interface unless polled by the host operating system. In general, interface software handles the communication and protocol issues associated with communicating on the interface. Prior to transmission on a USB interface, data is put in a packetized format. Consequently, in an embodiment of the present invention in which connection 15 is implemented as a USB interface, the digital signature pattern is first packetized to put into a form adaptable to the USB interface. It should be understood that connection 15 can be embodied as other types of bus interfaces as well as a direct wired connection.

FIG. 3 shows a flow chart illustrating one method of detecting objects in a graphical system such as shown in FIG. 1. In accordance with this method, each object is assigned a unique digital signature (block 30), the digital signature (or lack thereof) is detected by a detecting device (block 31) which is subsequently provided to the display system controller (block 32) for determination of which object that detecting device 13 is pointed at.

FIG. 4 shows a flow chart illustrating another method of detecting objects in a graphical system such as shown in FIG. 1. In this embodiment, each object is assigned with a unique digital signature (block 40). The detecting device 13 is placed in an activation state (block 41). This is typically done by the user engaging the trigger of the video arcade gun or depressing a button on a light pen while aiming it at the screen. Once activated, the detecting device is optionally initiated (block 42) or reset to clear all preceding detected light patterns. The initiation can be an automatic event that occurs simultaneously at the detecting device when the detecting device is activated or can be controlled by the display system control. Next, the objects are caused to emit their corresponding unique digital signature (block 43). At this point the detecting device 13 detects the digital signature of the object (or lack thereof) that it is aimed at (block 44) and transmits the detected signature to the display system controller (block 45). The display system controller recognizes the digital signature and is able to use it for the desired application. For instance, in the case of a video game having targets the digital signature of the detected target can be provided to a game application in the display system controller to determine which target the gun is aimed at and whether a "hit" or "miss" has occurred.

In the case in which connection 15 is implemented as a universal serial bus (USB), communication between the detecting device and the display system controller is performed in accordance with USB interface communication techniques. In particular, the display system controller needs to poll the detecting device before the detector can indicate that it is in an active state. Similarly, the detecting device needs to be polled before transmitting the detected digital signature. In addition, prior to transmitting on the USB bus, data can also be packetized according to the USB interface format. Hence in the above described flow charts, additional steps are performed depending on the type of communication method being implemented on connection 15. In addition, it should be understood that other steps performed by the display system controller are not described in detail such as what operations are carried out by software applications once the digital signature data is received.

It should be noted that in prior art systems the object detection accuracy relies upon a quick response signal from the detector to the display controller so as to latch an e-beam x/y coordinate counting device. Hence, the accuracy of these prior art systems is dependent on how fast the signal is able to travel from the detecting device 13 to CRT controller to latch in the correct position coordinate of the object. In contrast, the detection of objects in the system shown in FIG. 1 does not rely upon latching in coordinate values of an x/y counter in the display controller and hence minimizes the time constraints of transmitting a detection signal from the detecting device to the system controller.

In the preceding description, specific details are set forth, such as digital signature pattern format and system bus interface type in order to provide a thorough understanding of the present invention. It will be apparent, however, to one skilled in the art that these specific details need not be employed to practice the present invention. In other instances, well-known display system structures have not been described in detail in order to avoid unnecessarily obscuring the present invention.

Moreover, although the elements of the present invention have been described in conjunction with certain embodiments, it is appreciated that the invention can be implemented in a variety of other ways. Consequently, it is to be understood that the particular embodiments shown and described by way of illustration is in no way intended to be considered limiting. Reference to the details of these embodiments is not intended to limit the scope of the claims which themselves recite only those features regarded as essential to the invention.

What is claimed is:

1. A method of detecting objects on a display screen having an associated controller comprising the steps of:

causing a plurality of said objects to visually and simultaneously emit an unique object identification signal on said screen, said object identification signal being an encoded binary signal;

detecting at least one of said object identification signals emitted from said screen corresponding to at least one of said objects in order to identify said at least one object;

providing to said controller said at least one object identification signal;

said controller identifying said at least one of said plurality of objects on said screen using said at least one of said object identification signals.

2. The method as described in claim 1 wherein said step of detecting comprises the step of photoelectrically detecting.

3. The method as described in claim 1 wherein said step of detecting further comprising the steps of setting a detecting device in an active-state.

4. The method as described in claim 3 wherein said step of detecting further comprises the step of initializing said detecting device by clearing all preceding detected light patterns detected by said detecting device.

5. The method as described in claim 1 wherein said step of detecting is performed by aiming a detecting device at said at least one of said objects.

6. The method as described in claim 1 wherein said step of providing to said controller comprises transmitting said at least one object identification signal on a universal serial bus.

7. The method as described in claim 1 wherein said step of detecting further includes the step of detecting the absence of any of said object identification signals.

8. The method as described in claim 3 wherein said plurality of said objects emit said unique object identification signal after said detecting device is set into said active state.

9. A system for detecting objects on a screen comprising:

a display screen for displaying objects a display system controller for causing a plurality of said objects to visually an simultaneously emit an unique object identification signal corresponding to each of said plurality of objects from said screen for at least a portion of the time said plurality of objects are displayed, said object identification signal being an encoded binary signal;

a detector for detecting at least one of said object identification signals and providing to said controller said at least one of said object identification signals.

10. The system as described in claim 9 wherein said detector is set in an active-state prior to detecting said at least one object identification signal.

11. The system as described in claim 10 wherein said detector is initialized prior to detecting said at least one object identification signal.

12. The system as described in claim 9 wherein said detector and said display screen controller communicate over a serial bus.

13. The system as described in claim 12 wherein said serial bus is characterized as a polled interface.

14. The system as described in claim 12 wherein said serial bus is a universal serial bus.

15. The system as described in claim 9 wherein said detector includes an optical sensor.

16. The system as described in claim 9 wherein said detector is a light pen.

17. The system as described in claim 9 wherein said detector is a video game gun and said objects are targets on said screen.

18. The system as described in claim 9 wherein said detector also detects the absence of said one object identification signal.

19. The system as described in claim 9 wherein said controller includes an application which recognizes said object identification signals.

20. The system as described in claim 9 wherein said object identification signals are a sequence of encoded light pulses representing a digital code.

21. The system as described in claim 20 wherein said digital code is a binary digital code.

22. The system as described in claim 20 wherein said digital code is an ASCII code.

23. The system as described in claim 20 wherein said digital code is a bar code.

* * * * *